United States Patent
Matsumoto et al.

(10) Patent No.: US 10,162,158 B2
(45) Date of Patent: Dec. 25, 2018

(54) PROJECTION LENS WITH PERIPHERAL THICK PART AND VEHICLE LAMP PROVIDED WITH THE SAME

(71) Applicant: KOITO MANUFACTURING CO., LTD., Tokyo (JP)

(72) Inventors: Akinori Matsumoto, Shizuoka (JP); Tatsuhiko Yamamichi, Shizuoka (JP); Kenji Yoshida, Shizuoka (JP); Masashi Katayama, Shizuoka (JP); Takahito Osawa, Shizuoka (JP); Mamoru Kosuge, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 41 days.

(21) Appl. No.: 15/037,547

(22) PCT Filed: Nov. 13, 2014

(86) PCT No.: PCT/JP2014/080007
§ 371 (c)(1),
(2) Date: May 18, 2016

(87) PCT Pub. No.: WO2015/076167
PCT Pub. Date: May 28, 2015

(65) Prior Publication Data
US 2016/0298817 A1    Oct. 13, 2016

(30) Foreign Application Priority Data
Nov. 21, 2013  (JP) .................. 2013-241318

(51) Int. Cl.
*G02B 19/00* (2006.01)
*F21S 41/255* (2018.01)
(Continued)

(52) U.S. Cl.
CPC ........ *G02B 19/0009* (2013.01); *F21S 41/147* (2018.01); *F21S 41/255* (2018.01);
(Continued)

(58) Field of Classification Search
CPC .. F21S 48/1216; F21S 48/125–48/1291; F21S 41/147; F21S 41/148;
(Continued)

(56) References Cited

U.S. PATENT DOCUMENTS 6,055,111 A     4/2000 Nomura et al.
6,144,505 A    11/2000 Nakanishi et al.
(Continued)

FOREIGN PATENT DOCUMENTS

JP    11-14804 A    1/1999
JP    2000-856 A    1/2000
(Continued)

OTHER PUBLICATIONS

Written Opinion, issued by International Searching Authority in corresponding International Application No. PCT/JP2014/080007, dated Dec. 22, 2014. (PCT/ISA/237).
(Continued)

*Primary Examiner* — Anh Mai
*Assistant Examiner* — Steven Horikoshi
(74) *Attorney, Agent, or Firm* — Sughrue Mion, PLLC

(57) ABSTRACT

A projection lens formed of a light-transmitting resin including an incidence part on which light is incident, an emission part, a peripheral edge portion, and a thick part. Light is incident on the incidence part. The emission part emits the light incident from the incidence part. The peripheral edge portion is provided at a boundary between the incidence part and the emission part. The thick part is provided at a part of the peripheral edge portion, made thicker in an optical axis direction than other parts of the peripheral edge portion and having a gate mark formed at least on a part of an outer peripheral surface of the thick part.

4 Claims, 14 Drawing Sheets

(51) Int. Cl.
*F21S 41/147* (2018.01)
*F21S 41/29* (2018.01)
*G02B 7/02* (2006.01)

(52) U.S. Cl.
CPC ............ *F21S 41/295* (2018.01); *G02B 7/022* (2013.01); *G02B 19/0028* (2013.01); *G02B 19/0061* (2013.01)

(58) Field of Classification Search
CPC .... F21S 41/25–41/275; G02B 19/0009; G02B 19/0014; G02B 19/0061
See application file for complete search history.

(56) References Cited

U.S. PATENT DOCUMENTS

| 2003/0198060 A1* | 10/2003 | Ishida | F21S 41/147 362/516 |
| 2005/0254254 A1* | 11/2005 | Moseler | C03B 11/08 362/520 |
| 2007/0133220 A1* | 6/2007 | Watanabe | B29C 65/08 362/538 |
| 2010/0321949 A1 | 12/2010 | Ohno et al. | |

FOREIGN PATENT DOCUMENTS

| JP | 2000-113701 A | 4/2000 |
| JP | 2000135729 A | 5/2000 |
| JP | 2004319380 A | 11/2004 |
| JP | 2005010657 A | 1/2005 |
| JP | 2011-3454 A | 1/2011 |

OTHER PUBLICATIONS

International Search Report, issued by International Searching Authority in corresponding International Application No. PCT/JP2014/080007, dated Dec. 22, 2014. (PCT/ISA/210).
Communication dated Jun. 26, 2018 issued by the Japanese Patent Office in counterpart Japanese Application No. 2015-549090.

* cited by examiner

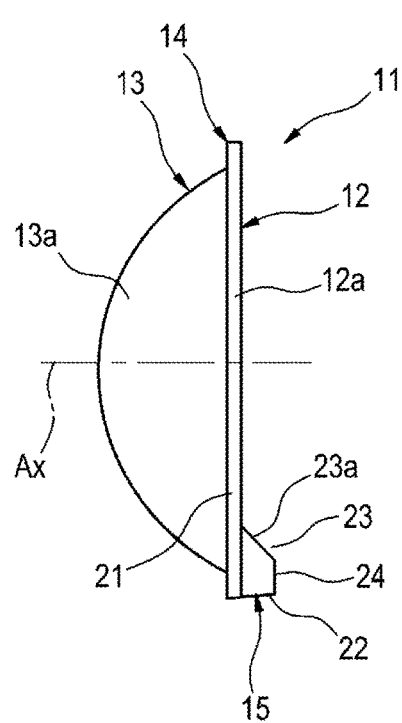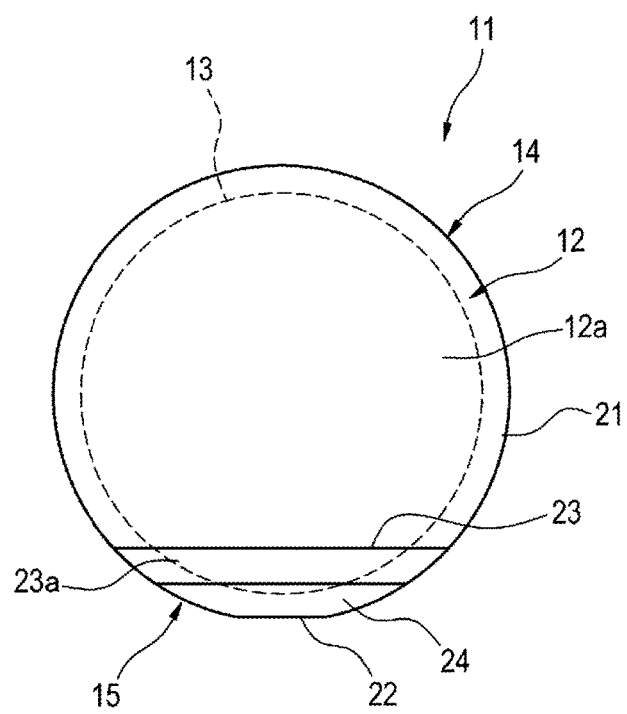

PROJECTION LENS WITH PERIPHERAL THICK PART AND VEHICLE LAMP PROVIDED WITH THE SAME

TECHNICAL FIELD

The invention relates to a projection lens configuring a vehicle lamp and a vehicle lamp having the same.

RELATED ART

A vehicle lamp having a projection lens, which is configured to emit light of a light source incident on an incidence part from an emission part and to irradiate a front of the lamp, has been known. The projection lens is molded by injecting a melted transparent resin into a cavity of a mold, for example (refer to Patent Document 1, for example).

CITATION LIST

Patent Documents

Patent Document 1: Japanese Patent Application Publication No. 2000-113701A

SUMMARY OF THE INVENTION

Problems to be Solved

A runner, which is a flow path configured to feed the melted resin into the cavity of the mold, communicates with a part for molding a peripheral edge portion, which is to be formed at a boundary between the incidence part and the emission part, through a gate. The melted resin passes through the gate and is filled in the cavity.

Since the peripheral edge portion of the projection lens is thin in an optical axis direction, the gate in communication with a part of the peripheral edge portion becomes thin. As a result, a pressure loss in the gate increases, so that a sufficient filling pressure is not obtained and the moldability may be thus deteriorated. For example, a part of the melted resin filled in the cavity is started to be solidified from a mold surface of the gate and a gate sectional area is further reduced, so that a quality may be deteriorated and the cost may increase due to the decrease in productivity.

It is therefore an object of the invention to provide a high-quality projection lens that can be manufacture at low cost and a vehicle lamp having the projection lens.

Means for Solving the Problems

In order to achieve the above object, a projection lens of the invention is a projection lens formed of a light-transmitting resin, and includes:
an incidence part on which light is incident;
an emission part emitting the light incident from the incidence part;
a peripheral edge portion provided at a boundary between the incidence part and the emission part, and
a thick part provided at a part of the peripheral edge portion, made thicker in an optical axis direction than other parts of the peripheral edge portion and having a gate mark formed at least on a part of an outer peripheral surface of the thick part.

According to the projection lens having the above configuration, it is possible to secure a large gate sectional area by enabling a gate to communicate with a thick part-molding part of a cavity of a mold for molding the projection lens. Therefore, a pressure loss in the gate is suppressed as much as possible, so that a melted resin is smoothly filled in the cavity. Thereby, it is possible to secure a sufficient filling pressure of the resin into the cavity, so that it is possible to improve the moldability, thereby improving size precision and a quality. Also, the pressure loss is suppressed as much as possible, so that it is possible to mold more projection lenses by one-time molding process and to thereby save the cost by improvement on the productivity.

In the projection lens of the invention, the thick part may be formed to protrude and to be thicker towards the incidence part-side, as compared to the other parts of the peripheral edge portion.

According to the projection lens having the above configuration, the thick part is formed to protrude and to be thicker towards the incidence part-side in which an invalid light distribution area becoming a dead space is likely to increase as compared to the emission part-side. Thereby, it is possible to effectively use the invalid light distribution area.

In the projection lens of the invention, when seeing the projection lens from a side thereof, the outer peripheral surface of the thick part has a first surface having the gate mark formed thereon and a second surface opposite to the first surface, and the second surface may be inclined so that the thick part becomes thinner in the optical axis direction as the second surface comes closer to an optical axis of the projection lens.

According to the projection lens having the above configuration, it is possible to secure a flow path width of the melted resin, which is substantially the same as a flow path width of the gate, at the thick part-molding part of the mold, so that it is possible to smoothly fill the melted resin towards an inside of the cavity of the mold. Therefore, it is possible to further improve the moldability, thereby improving the size precision and the quality.

A vehicle lamp of the invention includes the projection lens and a light source irradiating light to the incidence part of the projection lens.

According to the vehicle lamp having the above configuration, it is possible to suppress the manufacturing cost by using the projection lens that can be manufacture at low cost. Also, since the light is refracted at the thick part of the projection lens, it is possible to prevent an inside structure of the projection lens from being visible when seeing the lamp from an outside, and an appearance can be improved.

The vehicle lamp of the invention may further have a holder holding the projection lens, and the holder may have an engaging part that can be engaged with the thick part.

According to the vehicle lamp having the above configuration, the thick part of the projection lens is engaged with the engaging part of the holder, so that it is possible to easily position and mount the projection lens to the holder.

Effects of the Invention

According to the invention, it is possible to provide the high-quality projection lens that can be manufactured at low cost and the vehicle lamp having the projection lens.

BRIEF DESCRIPTION OF THE DRAWINGS

FIG. 2A depicts a side view of the projection lens according to the illustrative embodiment as seen from the incidence part-side.

FIG. 2B depicts a front view of the projection lens according to the illustrative embodiment as seen from the incidence part-side.

DETAILED DESCRIPTION OF ILLUSTRATIVE EMBODIMENTS

Hereinafter, illustrative embodiments of a projection lens of the invention and a vehicle lamp having the projection lens will be described with reference to the drawings.

Figure 1:
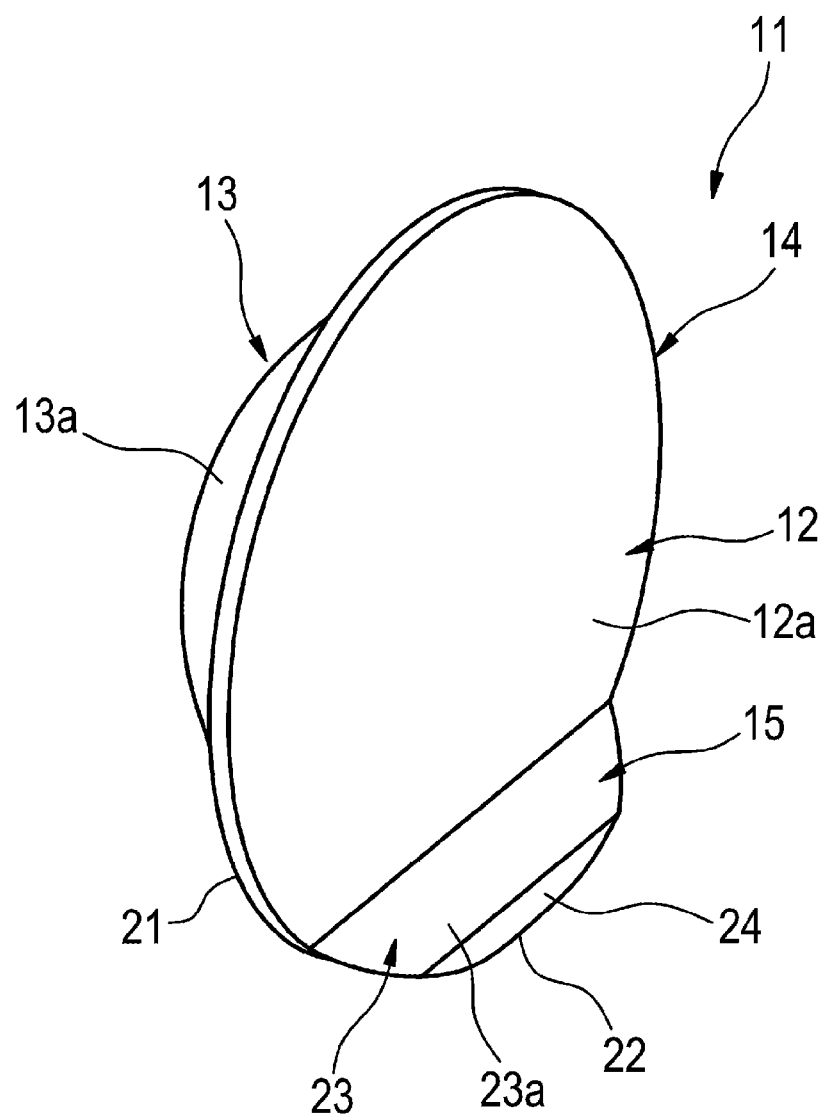
FIG. 1 is a perspective view depicting a projection lens according to an illustrative embodiment, which is seen from an incidence part-side.

FIG. 1 is a perspective view depicting a projection lens according to an illustrative embodiment, which is seen from an incidence part-side. FIG. 2 depicts the projection lens according to the illustrative embodiment, in which FIG. 2A is a side view and FIG. 2B is a front view, as seen from the incidence part-side.

As shown in FIGS. 1 and 2, a projection lens 11 of the illustrative embodiment has an incidence part 12, an emission part 13, a peripheral edge portion 14 and a thick part 15. The projection lens 11 is formed of a light-transmitting and transparent resin and has a circular shape, as seen from the front. The projection lens 11 has a planar incident surface 12a on the incidence part 12, and light is incident on the incident surface 12a of the incidence part 12. Also, the projection lens 11 has a convexly bulging emission surface 13a on the emission part 13, and is configured to emit the light, which is incident from the incident surface 12a of the incidence part 12, from the emission surface 13a of the emission part 13. The projection lens 11 has an optical axis Ax passing through the incident surface 12a of the incidence part 12 and the emission surface 13a of the emission part 13. The projection lens 11 is configured to refract the light, which is incident on the incident surface 12a, towards the optical axis Ax and to emit the same from the emission surface 13a.

The peripheral edge portion 14 is provided at a boundary between the incidence part 12 and the emission part 13 over a circumferential direction of the projection lens 11. The peripheral edge portion 14 has a flange portion 21 protruding outwards.

The thick part 15 is provided at a part of the peripheral edge portion 14. The thick part 15 is made thicker in an optical axis Ax direction than other parts of the peripheral edge portion 14. The thick part 15 is formed to protrude and to be thicker towards the incidence part 12-side, as compared to the other parts of the peripheral edge portion 14. The thick part 15 has an outer edge surface 22 (an example of the first surface) being along the peripheral edge portion 14, an inner edge surface 23 (an example of the second surface) arranged closer to the optical axis Ax than the outer edge surface 22, and a connection surface 24 connecting the outer edge surface 22 and the inner edge surface 23. The outer edge surface 22 has a gate mark, which is formed as a gate part is cut upon molding. The inner edge surface 23 is arranged to be opposite to the outer edge surface 22 when seeing the projection lens 11 from a side thereof. The inner edge surface 23 has a tapered surface 23a, which is inclined so that the thick part 15 becomes thinner in the optical axis direction as the tapered surface comes closer to the optical axis Ax of the projection lens 11. As shown in FIG. 2B, when seeing the projection lens 11 from the front thereof, both ends of the inner edge surface 23 extend to the peripheral edge portion 14 in the left-right direction, and an outward line of the thick part 15 is made as small as possible, so that it is inconspicuous.

In the below, a vehicle lamp of an illustrative embodiment having the projection lens is described.

Figure 3:
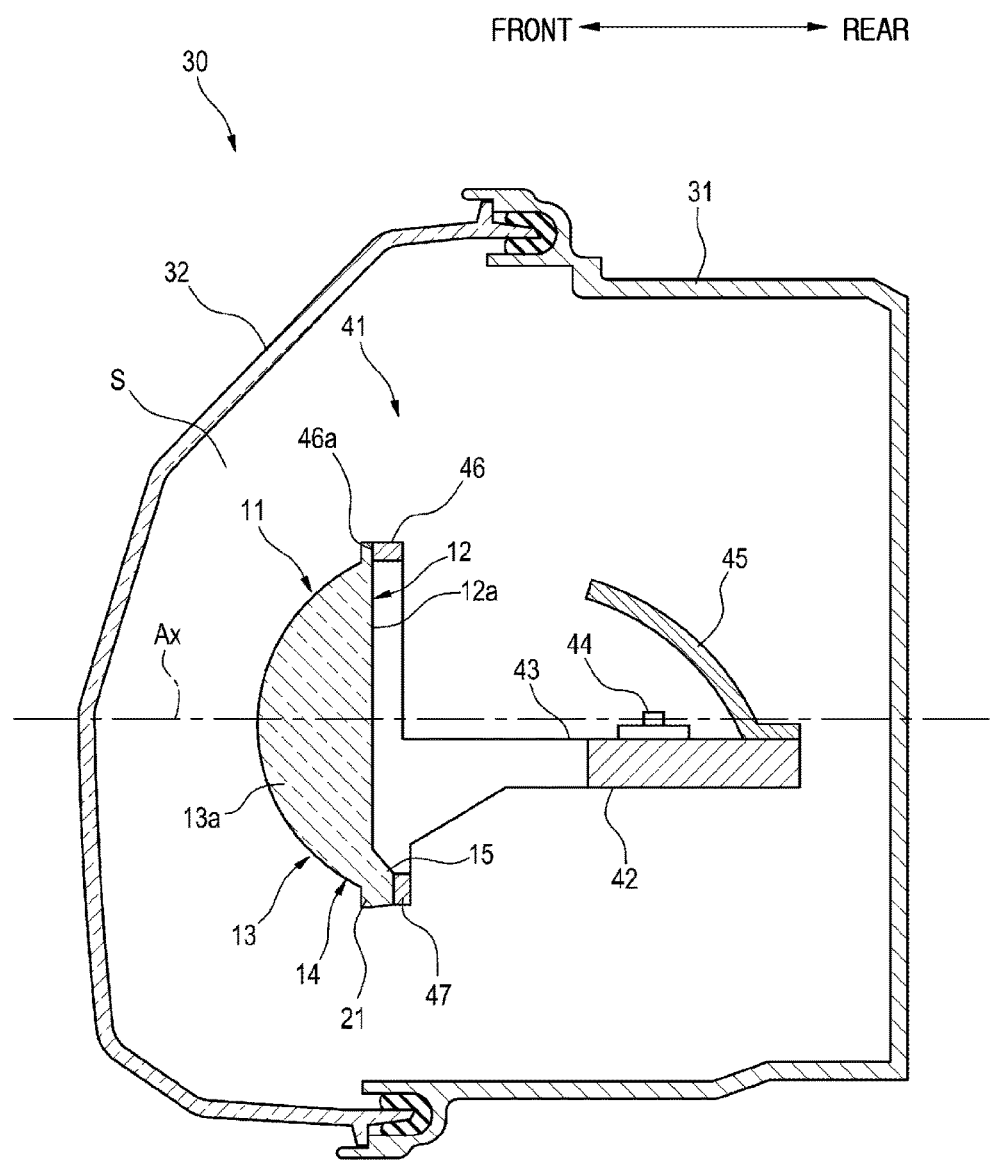
FIG. 3 is a sectional view depicting a vehicle lamp according to an illustrative embodiment.
Figure 4:
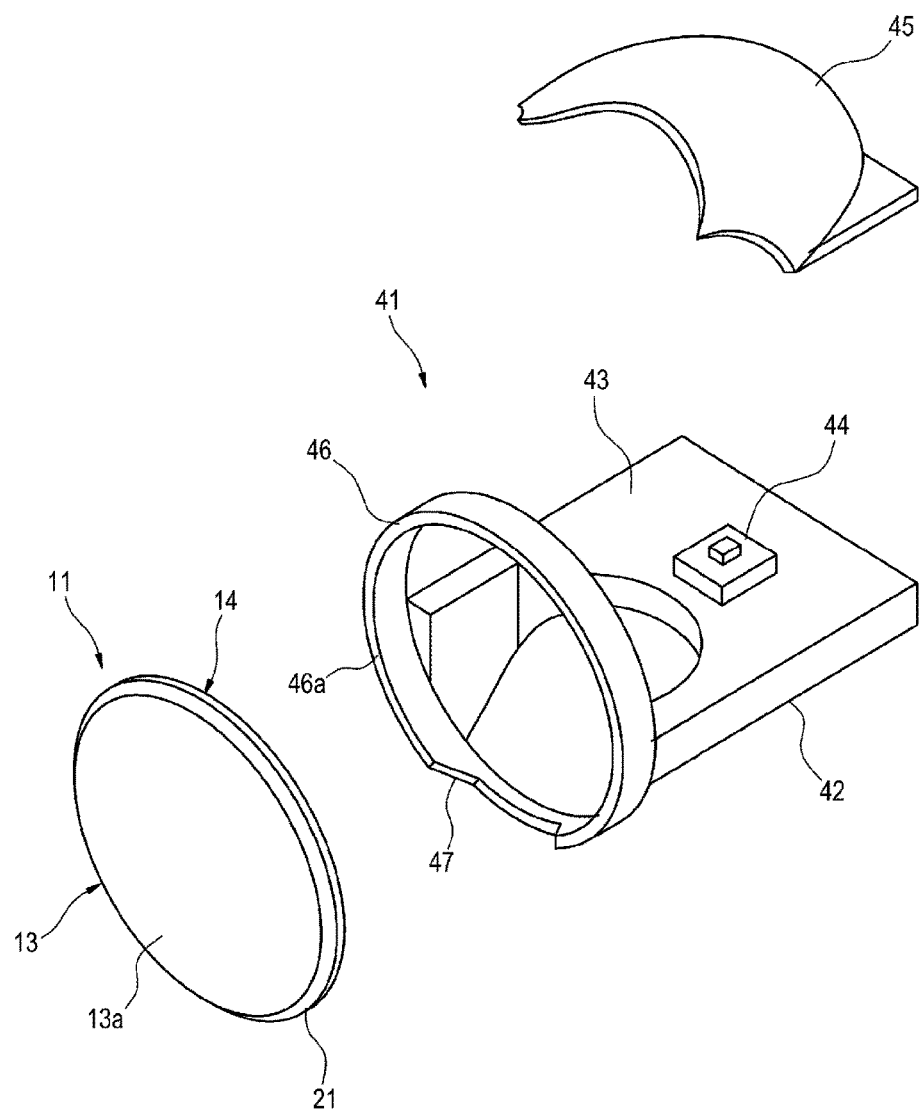
FIG. 4 is an exploded perspective view of a light source unit configuring the vehicle lamp.

FIG. 3 is a sectional view depicting a vehicle lamp according to an illustrative embodiment. FIG. 4 is an exploded perspective view of a light source unit configuring the vehicle lamp.

As shown in FIG. 3, a vehicle lamp 30 has a lamp body 31 opening forwards and a light-transmitting cover 32 attached to cover the opening of the lamp body 31. The vehicle lamp 30 is a headlight provided at a front part of a vehicle and configured to illuminate a front of the vehicle.

In the illustrative embodiment, a front is the light-transmitting cover 32-side of the vehicle lamp 30 (a left direction in FIG. 3), and a rear is the lamp body 31-side (a right direction in FIG. 3), which is opposite to the front.

The light-transmitting cover 32 is bonded and fixed to the lamp body 31. By attaching the light-transmitting cover 32 to the lamp body 31, a hermetically-sealed lamp chamber S is formed in the vehicle lamp 30.

The vehicle lamp 30 has the projection lens 11 and a light source unit 41 in the lamp chamber S. The projection lens 11 is arranged so that the optical axis Ax thereof faces towards a front-rear direction of the vehicle, and the light source unit 41 is arranged at the rear of the projection lens 11.

As shown in FIG. 4, the light source unit 41 has a support part 42 that is supported by the lamp body 31. The support part 42 has a light source-fixing surface 43 consisting of a horizontal surface along the optical axis Ax in the front-rear direction of the vehicle. A light source 44 having an LED (Light Emitting Diode) is fixed to the light source-fixing surface 43, and is configured to emit the light substantially upwards. Also, a reflector 45 is fixed to the light source-fixing surface 43 so as to cover the light source 44 from above. The reflector 45 has an inner surface consisting of a free curved surface based on an elliptical shape, for example, and is configured to reflect forwards the light from the light source 44 towards the optical axis Ax and to converge the light in the vicinity of a rear focus of the projection lens 11.

The support part 42 has a holder 46 configured to hold the projection lens 11. The holder 46 has a circular shape, and the flange portion 21 of the projection lens 11 facing towards the incidence part 12 is fixed to an end face 46a of the holder 46 by welding, bonding or the like. Thereby, the projection lens 11 is held to the holder 46 of the support part 42 with the incidence part 12 facing towards the light source 44. The circular holder 46 has an engaging part 47, which is configured by a concave portion formed at a side facing towards the projection lens 11. The engaging part 47 is engaged with the thick part 15 formed at the incidence part 12-side of the projection lens 11. Thereby, the projection lens 11 is positioned with the thick part 15 being arranged at a lower side and is fixed to the holder 46.

In the vehicle lamp 30 having the above structure, when the light source 44 of the light source unit 41 is turned on, a direct light from the light source 44 and a reflected light from the reflector 45 are irradiated to the projection lens 11. The light irradiated from the light source unit 41 to the projection lens 11 passes through the projection lens 11, and is refracted towards the optical axis Ax, and is then irradiated to the front of the vehicle.

Figure 5:
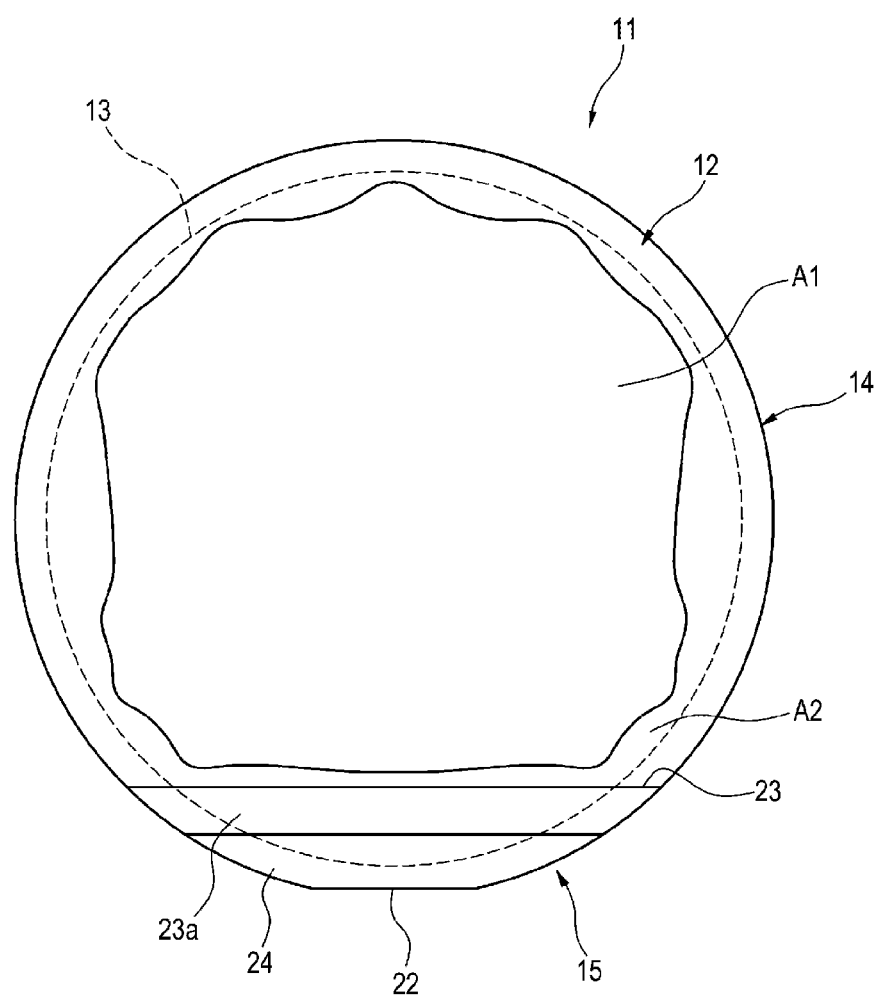
FIG. 5 is a schematic front view, as seen from the incidence part-side of the projection lens, depicting a valid light distribution area and an invalid light distribution area obtained by a simulation of a light path of light from the light source.

Herein, as shown in FIG. 5, the incidence part 12-side of the projection lens 11 of the illustrative embodiment has a valid light distribution area A1, which contributes to light distribution, and an invalid light distribution area A2, which does not contribute to the light distribution. The valid light distribution area A1 and the invalid light distribution area A2 are obtained by simulating a light path of the light from the light source. The light from the light source is incident from the valid light distribution area A1 of the incidence part 12 and is not incident on the invalid light distribution area A2 of the incidence part 12.

In the projection lens 11 of the illustrative embodiment, the thick part 15 is formed in the invalid light distribution area A2, which is a dead space of the incidence part 12 deviating from the valid light distribution area A1 Therefore, when the light is incident on the incidence part 12 of the projection lens 11, the light is not interrupted by the thick part 15, so that the thick part 15 does not influence the light distribution. The thick part 15 is preferably formed at a position deviating from the valid light distribution area A1. However, the thick pan may be partially arranged in the valid light distribution area A1.

Figure 6:
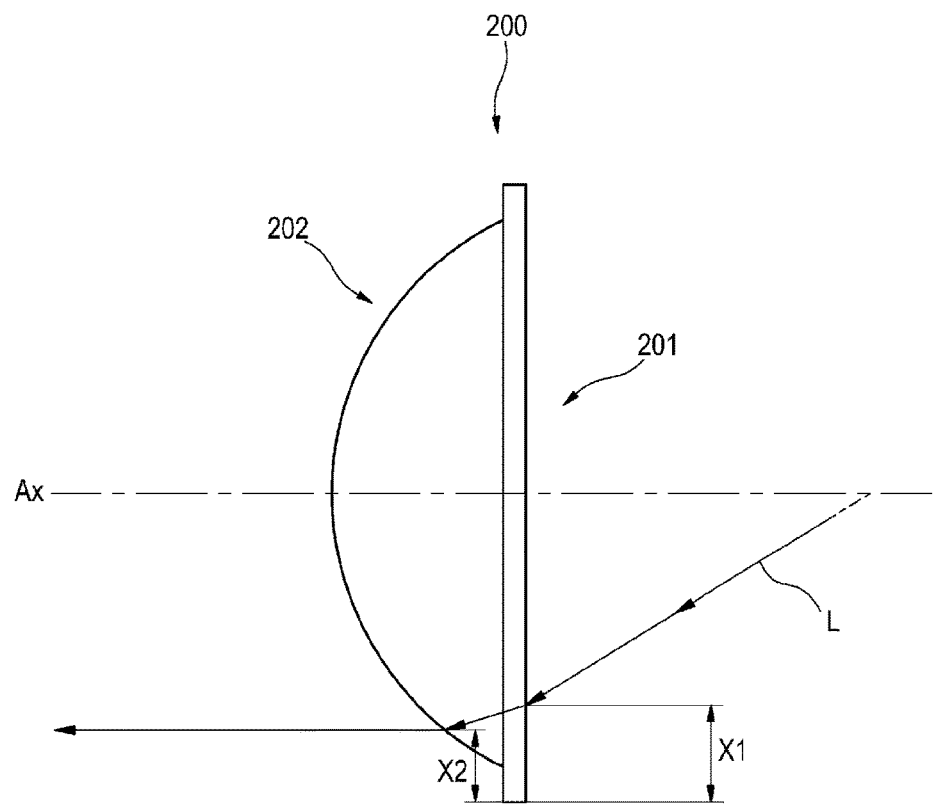
FIG. 6 is a side view of the projection lens depicting a light path of light passing through the projection lens.

In the meantime, the emission part 13-side of the projection lens 11 also has the valid light distribution area A1, which contributes to the light distribution, and the invalid light distribution area A2, which does not contribute to the light distribution. The light is emitted from the valid light distribution area A1 and is not emitted from the invalid light distribution area A2. As shown in FIG. 6, according to a projection lens 200 having a usual shape, the light incident from an incidence part 201 is refracted towards the optical axis Ax and is then emitted from an emission part 202. However, since the light L from the light source is incident on the incidence part 201 while being enlarged, the valid light distribution area is larger at the emission part 202-side than the incidence part 201-side. That is, an invalid light distribution area X1 of the incidence part 201-side is larger than an invalid light distribution area X2 of the emission part 202-side. Therefore, in the projection lens 11 of the illustrative embodiment, the thick part 15 formed in the invalid light distribution area A2 can be formed larger when it is provided at the incidence part 12-side, rather than the emission part 13-side.

In the below, a method of manufacturing the projection lens 11 of the illustrative embodiment is described.

Figure 7:
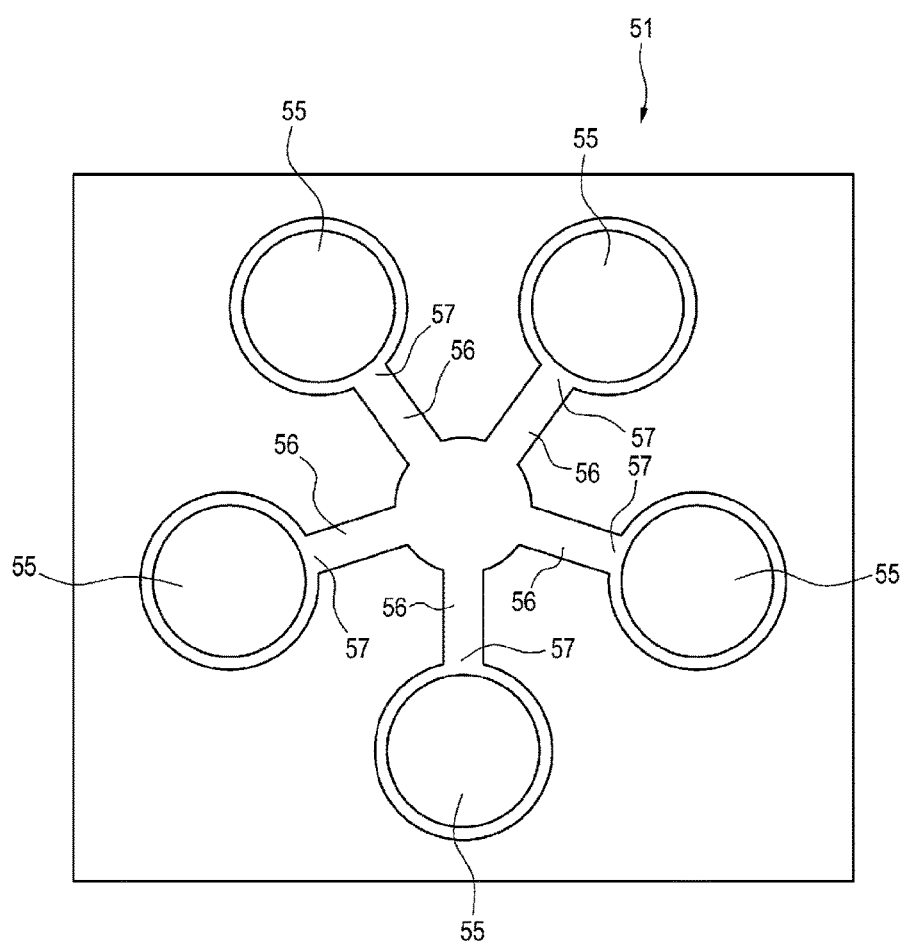
FIG. 7 is a schematic plan view of a moveable mold of a mold for lens molding configured to mold the projection lens.
Figure 8:
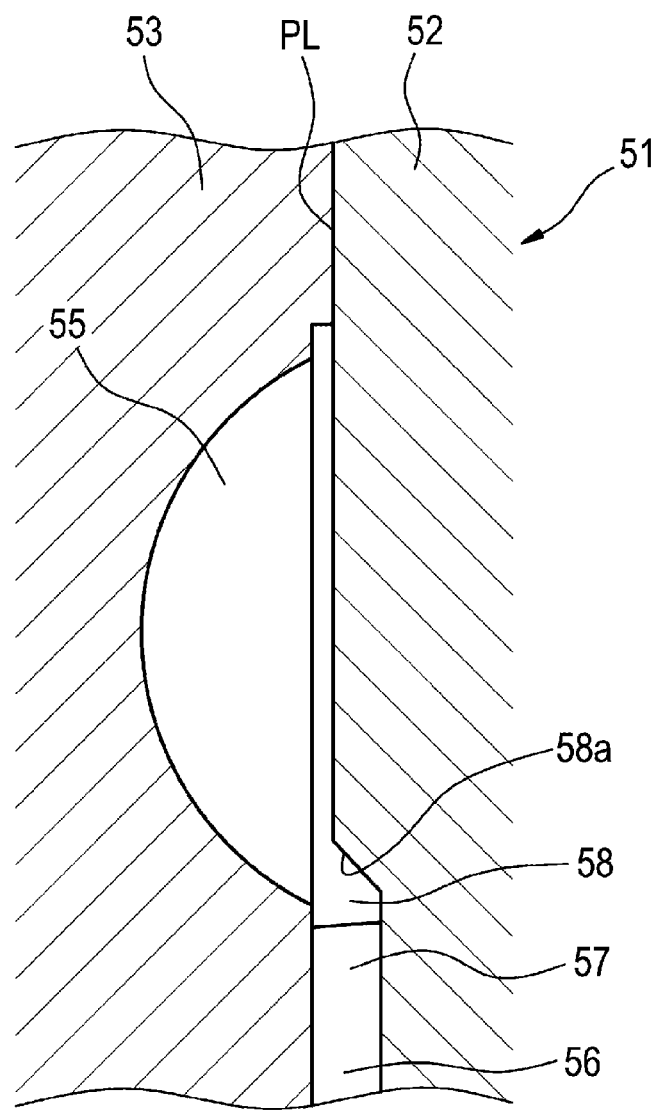
FIG. 8 is a sectional view depicting a part of the mold for lens molding configured to mold the projection lens.
Figure 9:
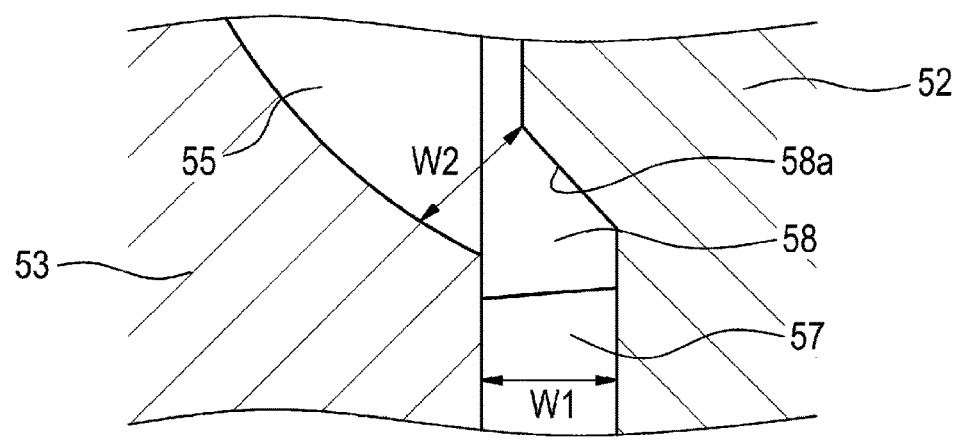
FIG. 9 is a sectional view of a communication part between a cavity and a gate of the mold for lens molding.

FIG. 7 is a schematic plan view of a moveable mold of a mold for lens molding configured to mold the projection lens. FIG. 8 is a sectional view depicting a part of the mold for lens molding configured to mold the projection lens. FIG. 9 is a sectional view of a communication part between a cavity and a gate of the mold for lens molding.

(Design Process of Thick Part)

A size and a shape of the thick part 15, which is to be formed in the invalid light distribution area A2, are determined by simulating the valid light distribution area A1 and the invalid light distribution area A2 of the incidence part 12-side of the projection lens 11 to be manufactured (refer to FIG. 3).

(Preparation Process of Mold)

As shown in FIGS. 7 and 8, a mold 51 for lens molding configured to mold the projection lens 11 is prepared. The mold 51 for lens molding has a fixed mold 52 and a moveable mold 53. When the fixed mold 52 and the moveable mold 53 of the mold 51 for lens molding are butted, a plurality of (five, in this example) cavities 55, which are molding spaces of the projection lens 11, runners 56 through which a melted resin is to be fed, and gates 57 configured to communicate the runners 56 and the cavities 55 each other are formed. In the mold 51 for lens molding, a parting line PL of the butting pan between the fixed mold 52 and the moveable mold 53 is arranged on the same plane as the incident surface 12a of the incidence part 12 of the projection lens 11.

As shown in FIG. 9, the cavity 55 is formed with a thick part-molding part 58 for molding the thick part 15, based on the valid light distribution area A1 and the invalid light distribution area A2 obtained in the design process of the thick part. The thick part-molding part 58 has an inclined surface 58a for forming the tapered surface 23a of the thick part 15. The thick part-molding part 58 is formed at a position facing towards the gate 57, and is configured to communicate with the gate 57. Thereby, the gate 57 can secure a large sectional area having a predetermined flow path width W1. Also, a flow path width W2 at an entrance part of the melted resin in the cavity 55 is substantially the same as the flow path width W1 of the gate 57. Also, a flow path width of the thick pan-molding part 58 is substantially the same as the flow path width W1 of the gate 57. In the meantime, the thick part-molding part 58 is preferably provided so that the thick part 15 is to be molded at a position deviating from the valid light distribution area A1, which is obtained in the design process of the thick part, by about 1 mm.

(Injection Molding Process)

At a state where the moveable mold 53 comes close to the fixed mold 52 and the fixed mold 52 and the moveable mold 53 are then butted, the Incited resin is injected into the runners 56. The injected melted resin flows from each runner 56 into each cavity 55 through each gate 57. At this time, since the gate 57 is made to communicate with the thick part-molding part 58 for molding the thick part 15, a large sectional area is secured. Therefore, the melted resin is very smoothly fed from the gate 57 into the cavity 55. Also, the thick pan-molding part 58 has the inclined surface 58a. Therefore, the flow path width of the thick part-molding part 58 is substantially the same as the flow path width of the gate 57 and the inclined surface 58a is provided, so that the melted resin is smoothly guided into the cavity 55.

After the resin is cured, the moveable mold 53 is moved to separate the fixed mold 52 and the moveable mold 53. Thereby, molded lens products are released from the mold, and each projection lens 11 is cut and separated at a boundary part with a solidified pan in the gate 57. The cutting mark at the boundary pan is the gate mark formed on the outer edge surface 22 of the thick part 15 of the projection lens 11.

Figure 10:
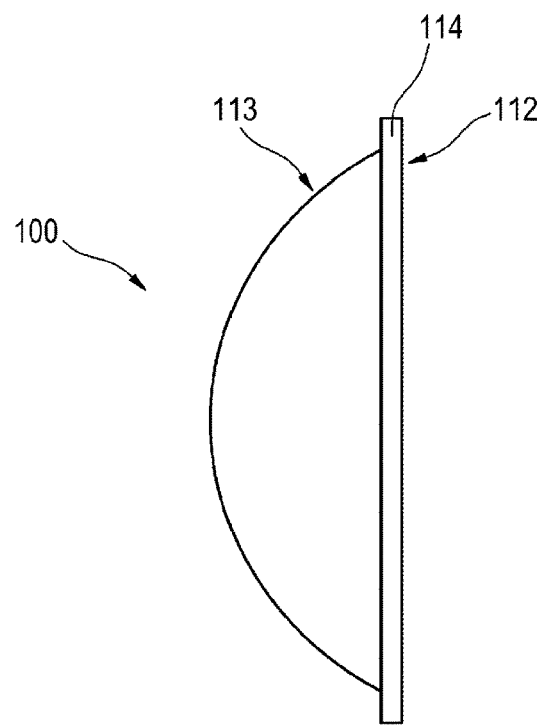
FIG. 10 is a side view depicting a projection lens according to a comparative example.
Figure 11:
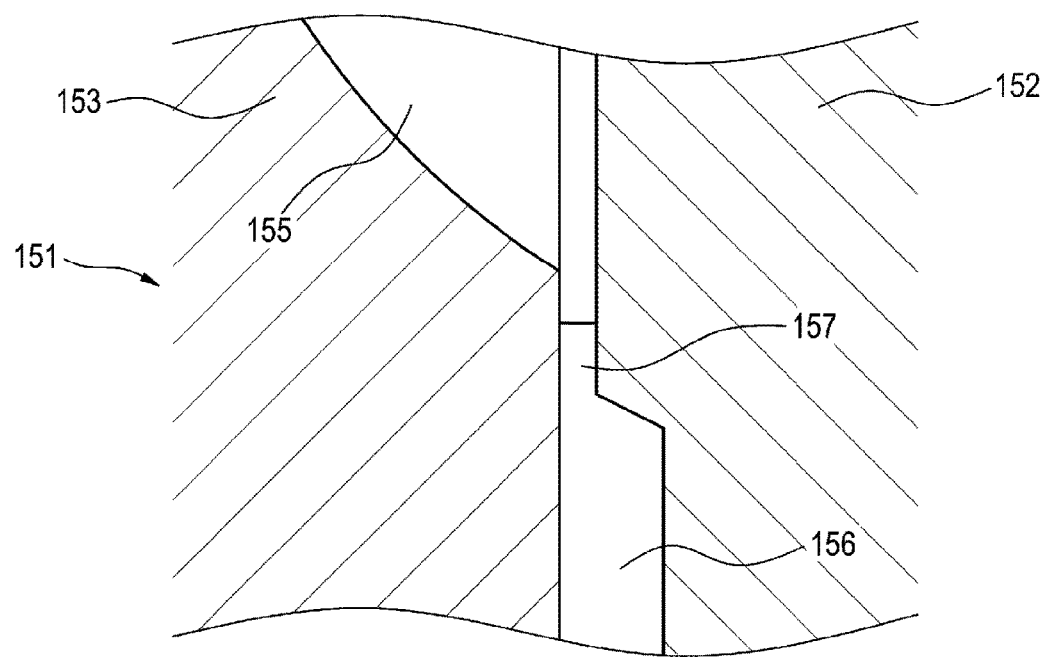
FIG. 11 is a sectional view of a communication part between a cavity and a gate of a mold for lens molding configured to mold the projection lens according to the comparative example.

In the meantime, as shown in FIG. 10, according to a configuration where the thick part is not provided at a peripheral edge portion 114 provided at a boundary between an incidence part 112 and an emission part 113 of a projection lens 100, it is not possible to form a thick part-molding part at a mold for lens molding 151 having a fixed mold 152 and a moveable mold 153, as shown in FIG. 11, and a flow path width of a gate 157 is narrower than a flow path width of the runner 156. In this case, therefore, a pressure loss in the gate 157 increases and the melted resin is not smoothly filled in the cavity 155, so that the sufficient filling pressure of the resin into the cavity 155 may not be obtained. In this case, a part of the resin is solidified in the gate 157, for example, so that the moldability is deteriorated. As a result, a possibility that a weld line will occur in a lens main body including the incidence part 112 and the emission part 113 to be formed in the cavity 155 increases. If the weld line occurs in the lens main body, an optical quality of the projection lens 100 is lowered. On the other hand, if a flowing speed of the resin is lowered or the number of the cavities 155 is reduced so as to secure the filling pressure of the resin into the cavity 155, the productivity is lowered. Like this, according to the mold for lens molding 151 shown in FIGS. 10 and 11, the quality may be lowered due to the deterioration of the moldability and the cost may increase due to the decrease in productivity.

In contrast, according to the projection lens 11 of the illustrative embodiment, since the thick part 15 is provided at a part of the peripheral edge portion 14 and is made thicker in the optical axis Ax direction than the other parts, it is possible to form the thick pan-molding part 58 for molding the thick pan 15 in the cavity 55 (refer to FIG. 8). Therefore, the gate 57 is made to communicate with the thick part-molding part 58, so that it is possible to secure the large sectional area of the gate 57. Therefore, the pressure loss in the gate 57 is suppressed as much as possible, so that the melted resin is smoothly filled in the cavity 55. Thereby, it is possible to secure the sufficient filling pressure of the resin into the cavity 55, so that it is possible to improve the moldability, thereby improving size precision and a quality. Also, the moldability is improved, so that it is possible to mold more projection lenses 11 by one-time molding process and to thereby save the cost by improvement on the productivity. That is, according to the illustrative embodiment, it is possible to manufacture the high-quality projection lens 11 at low cost.

Also, the thick part 15 is formed to protrude and to be thicker towards the incidence part 12-side, as compared to the other parts of the peripheral edge portion 14. In the projection lens 11, the invalid light distribution area A2 becoming a dead space is likely to be larger at the incidence part 12-side, as compared to the emission part 13-side. Therefore, when the thick part 15 is formed to protrude towards the incidence part 12-side, it is possible to efficiently use the invalid light distribution area A2.

Also, the thick part 15 of the projection lens 11 has the tapered surface 23a, which is inclined so that the thick part 15 becomes thinner in the optical axis direction as the tapered surface comes closer to the optical axis Ax of the projection lens 11. Also, the thick part-molding part 58 of the mold 51 for lens molding has the inclined surface 58a for forming the tapered surface 23a. The thick part-molding part 58 is provided with the inclined surface 58a, so that it is possible to secure the flow path width, which is substantially the same as the flow path width of the gate 57, for the thick part-molding part 58 and thus to smoothly guide the melted resin into the cavity 55. In this way, since the melted resin having passed through the gate 57 can be made to smoothly flow from the thick part-molding part 58 of the cavity 55 of the mold 51 for lens molding towards the inside of the cavity 55, it is possible to further improve the moldability, thereby improving the precision and the quality.

Also, according to the vehicle lamp 30 having the projection lens 11, it is possible to suppress the manufacturing cost by using the manufacturing cost that can be manufactured at low cost. Also, since the light incident from an outside is refracted at the thick part 15 of the projection lens 11, it is possible to prevent an inside structure of the projection lens 11 from being visible, when seeing the lamp from the outside, which improves an appearance.

Further, the thick part 15 of the projection lens 11 is engaged with the engaging part 47 of the holder 46, so that it is possible to easily position and mount the projection lens 11 to the holder 46.

In the below, projection lenses according to modified embodiments are described.

First Modified Embodiment

Figure 12:
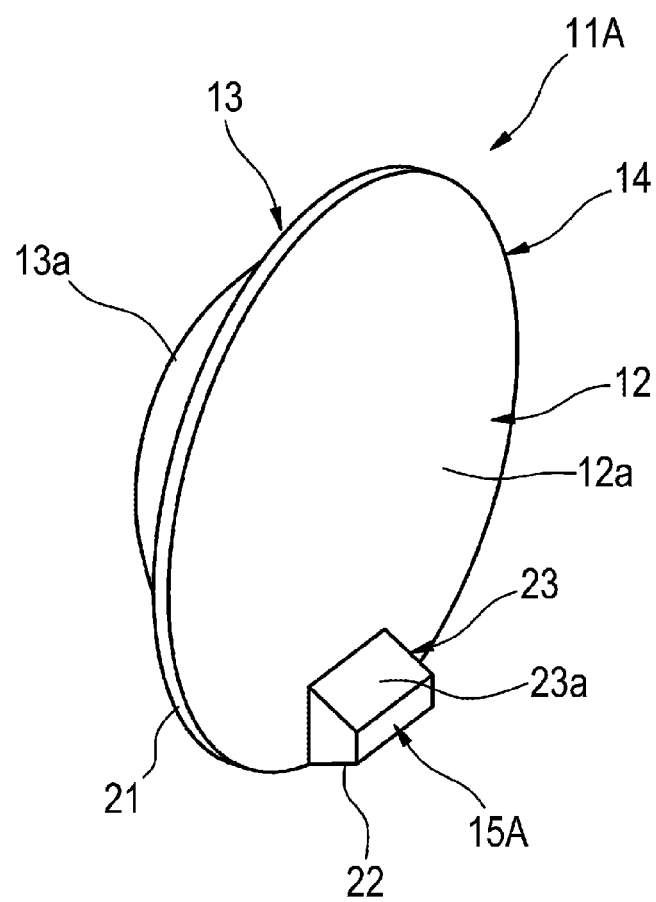
FIG. 12 is a perspective view depicting a projection lens according to a first modified embodiment, as seen from the incidence part-side.
Figure 13A:
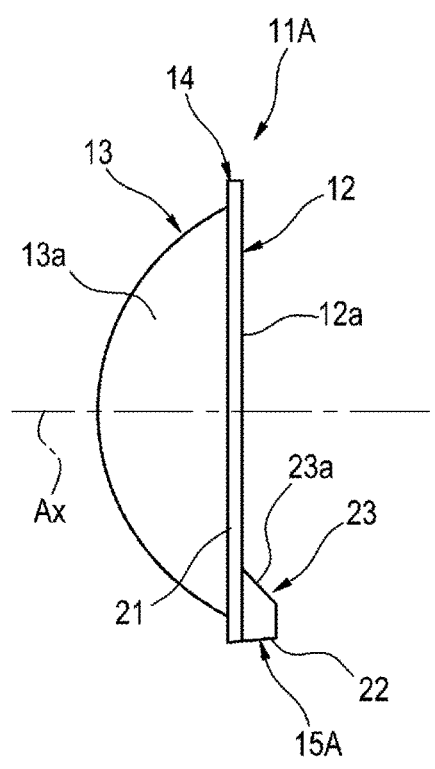
FIG. 13A depicts a side view of the projection lens according to the first modified embodiment as seen from the incidence part-side.
Figure 13B:
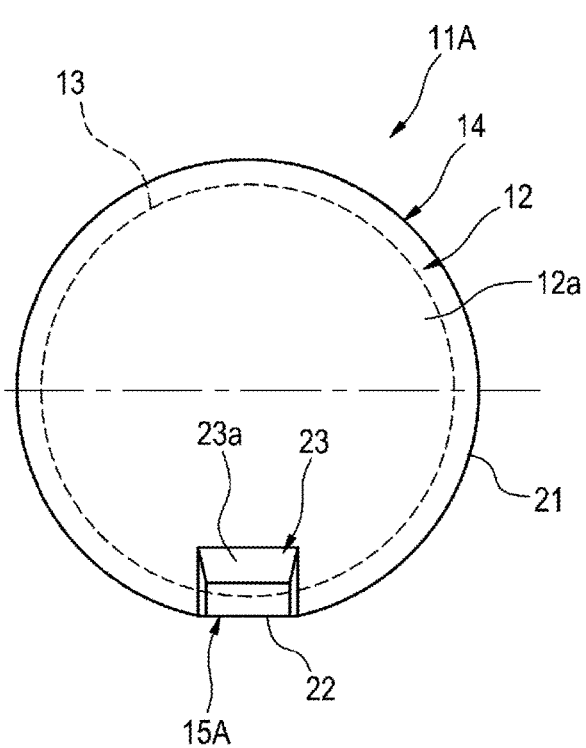
FIG. 13B depicts a front view of the projection lens according to the first modified embodiment as seen from the incidence part-side.

FIG. 12 is a perspective view depicting a projection lens according to a first modified embodiment, as seen from the incidence part-side. FIG. 13 depicts the projection lens according to the first modified embodiment, in which FIG. 13A is a side view and FIG. 13B is a front view, as seen from the incidence part-side.

As shown in FIGS. 12 and 13, a projection lens 11A according to the first modified embodiment has a thick part 15A of which a width size in the left-right direction is small. The thick part 15A is configured so that the width size thereof is substantially the same as a width size of the gate 57 of the mold 51 for lens molding.

Since the projection lens 11A also has the thick part 15A that is provided at a part of the peripheral edge portion 14 and is made thicker in the optical axis Ax direction than the other parts, it is possible to form the thick part-molding part 58 for molding the thick part 15A in the cavity 55 (refer to FIG. 8). Therefore, also in the projection lens 11A, it is possible to secure the large sectional area of the gate 57 by enabling the gate 57 to communicate with the thick part-molding part 58. Therefore, the pressure loss in the gate 57 is suppressed as much as possible, so that the melted resin is smoothly filled in the cavity 55. Thereby, it is possible to secure the sufficient filling pressure of the resin into the cavity 55, so that it is possible to improve the moldability, thereby improving the quality. Also, the moldability is improved, so that it is possible to mold more projection lenses 11A by one-time molding process and to thereby save the cost by improvement on the productivity.

Also, since the thick part 15A of the projection lens 11A is small, it is possible to make the thick part 15A invisible.

Second Modified Embodiment

Figure 14:
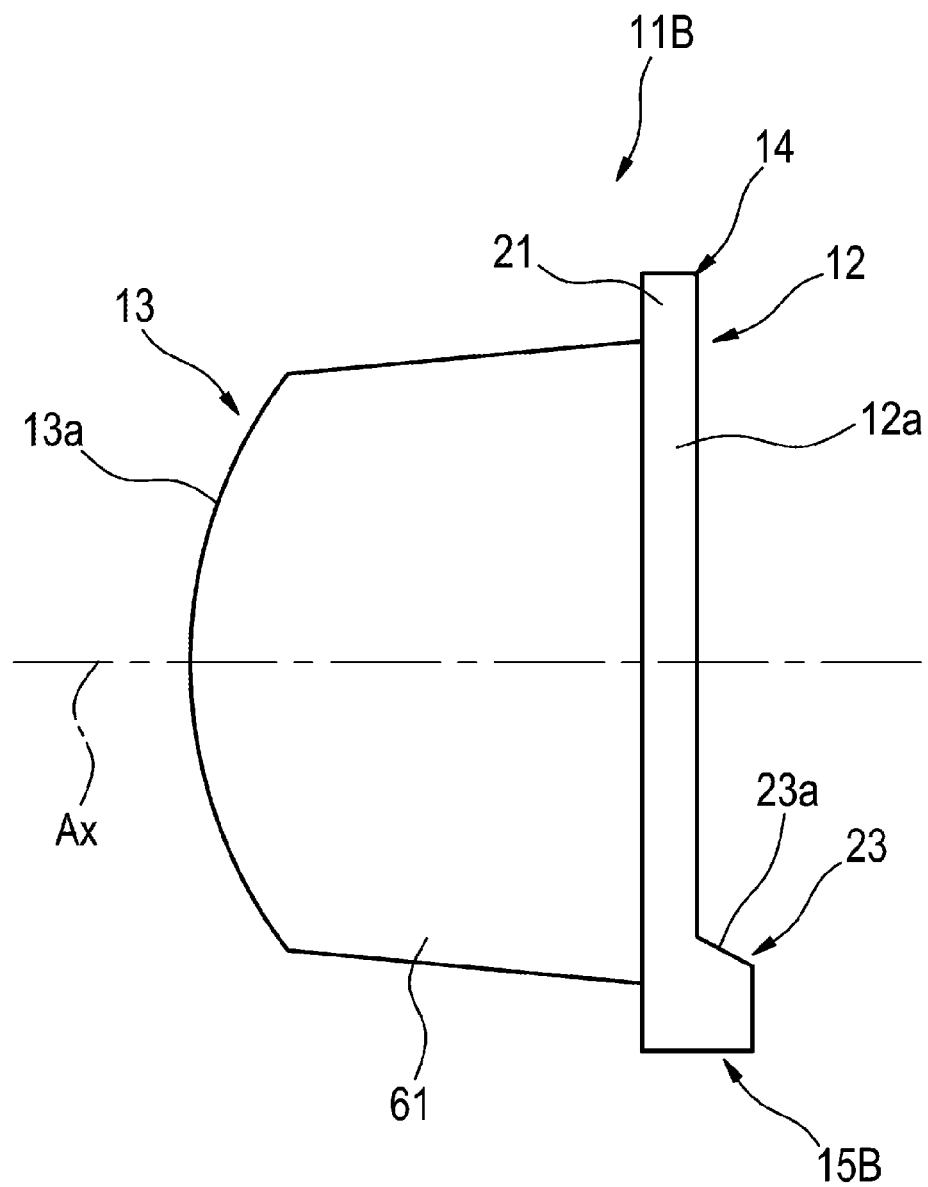
FIG. 14 is a side view depicting a projection lens according to a second modified embodiment.
Figure 15:
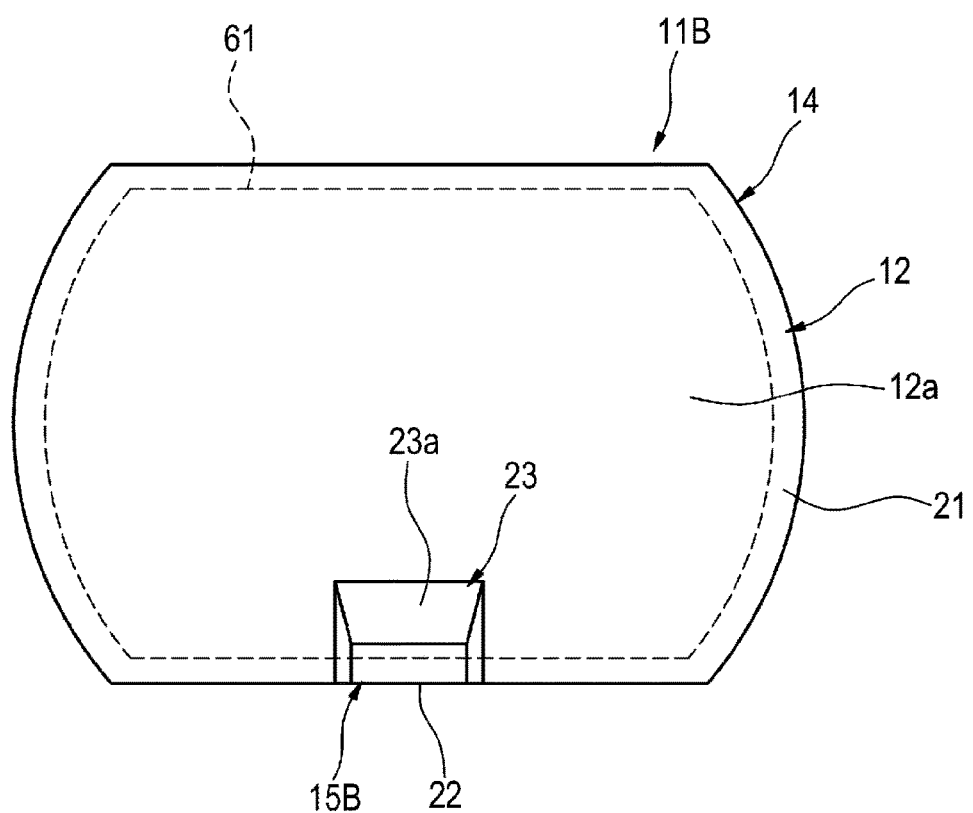
FIG. 15 is a front view depicting the projection lens according to the second modified embodiment, as seen from the incidence part-side.

FIG. 14 is a side view depicting a projection lens according to a second modified embodiment. FIG. 15 is a front view depicting the projection lens according to the second modified embodiment, as seen from the incidence part-side.

As shown in FIGS. 14 and 15, a projection lens 11B according to a second modified embodiment has an outer peripheral surface 61 between the incident surface 12a of the incidence part 12 and the emission surface 13a of the emission part 13. The projection lens 11B has a substantially rectangular shape, as seen from the front. That is, the projection lens 11B is a so-called irregular shaped lens having a shape, which is not circular as seen from the front. According to the projection lens 11B, a side of the outer peripheral surface 61 facing towards the incidence part 12 is formed with the flange portion 21 over the circumferential direction, and the flange portion 21 is configured as the peripheral edge portion 14. The projection lens 11B also has a thick part 15B that is provided at a part of the peripheral edge portion 14 and is made thicker in the optical axis Ax direction than the flange portion 21 of the other parts.

Since the projection lens 11B also has the thick part 15B that is provided at a part of the peripheral edge portion 14 and is made thicker in the optical axis Ax direction than the other parts, it is possible to form the thick part-molding part 58 for molding the thick part 15B in the cavity 55 (refer to FIG. 8). Therefore, it is possible to secure the large sectional area of the gate 57 by enabling the gate 57 to communicate with the thick part-molding part 58. Therefore, the pressure loss in the gate 57 is suppressed as much as possible, so that the melted resin is smoothly filled in the cavity 55. Thereby, it is possible to secure the sufficient filling pressure of the resin into the cavity 55, so that it is possible to improve the moldability, thereby improving the quality. Also, the moldability is improved, so that it is possible to mold more projection lenses 11A by one-time molding process and to thereby save the cost by improvement on the productivity.

The invention is not limited to the illustrative embodiment and the modified embodiments and can be appropriately modified and improved. In addition, the materials, shapes, sizes, numerical values, forms, number, arrangement places and the like of the respective constitutional elements in the illustrative embodiment are arbitrary and are not particularly limited inasmuch as the invention can be implemented.

For example, according to the vehicle lamp of the illustrative embodiment, an optical system (for example, a PES optical system) using a reflective surface has been exemplified. However, the invention is not limited thereto and may have a configuration where another optical system such as a so-called direct optical system (a mono focus optical system) configured to irradiate the light from the light source to the front of the lamp without via the reflective surface is provided, for example.

Although the invention has been described in detail with reference to the specific illustrative embodiment, it is apparent to one skilled in the art that a variety of changes and modifications can be made without departing from the spirit and scope of the invention.

The application is based on a Japanese Patent Application No. 2013-241318 filed on Nov. 21, 2013, which is herein incorporated for reference.

DESCRIPTION OF REFERENCE NUMERALS 11, 11A, 11B: projection lens, 12: incidence part, 13: emission part, 14: peripheral edge portion, 15, 15A, 15B: thick part, 30: vehicle lamp, 44: light source, 46: holder, 47: engaging part, Ax: optical axis

The invention claimed is:

1. A projection lens formed of a light-transmitting resin comprising:
   an incidence part on which light is incident;
   an emission part emitting the light incident from the incidence part;
   a peripheral edge portion provided at a boundary between the incidence part and the emission part, and
   a single thick part provided adjacent to a part of the peripheral edge portion,
   wherein the single thick part is thicker in an optical axis direction than other parts of the peripheral edge portion and includes a gate mark formed at least on a part of an outer peripheral surface of the single thick part,
   wherein the single thick part is located on a side of the incidence part of the projection lens,
   wherein when seeing the projection lens from a side thereof, the outer peripheral surface of the single thick part has a first surface having the gate mark formed thereon and a second surface opposite to the first surface,
   wherein the second surface is inclined so that the single thick part becomes thinner in the optical axis direction as the second surface comes closer to an optical axis of the projection lens, and
   wherein a width of the first surface is substantially equal to a width between the second surface and the emission part.

2. A vehicle lamp comprising:
   the projection lens according to claim 1; and
   a light source irradiating light to the incidence part of the projection lens.

3. The vehicle lamp according to claim 2, further comprising a holder holding the projection lens,
   wherein the holder comprises an engaging part that can be engaged with the single thick part.

4. The projection lens according to claim 1, further comprising a flat connection surface that connects to the first surface and the second surface, wherein an outer surface of the flat connection surface is perpendicular to the optical axis.

* * * * *